Figure 1:
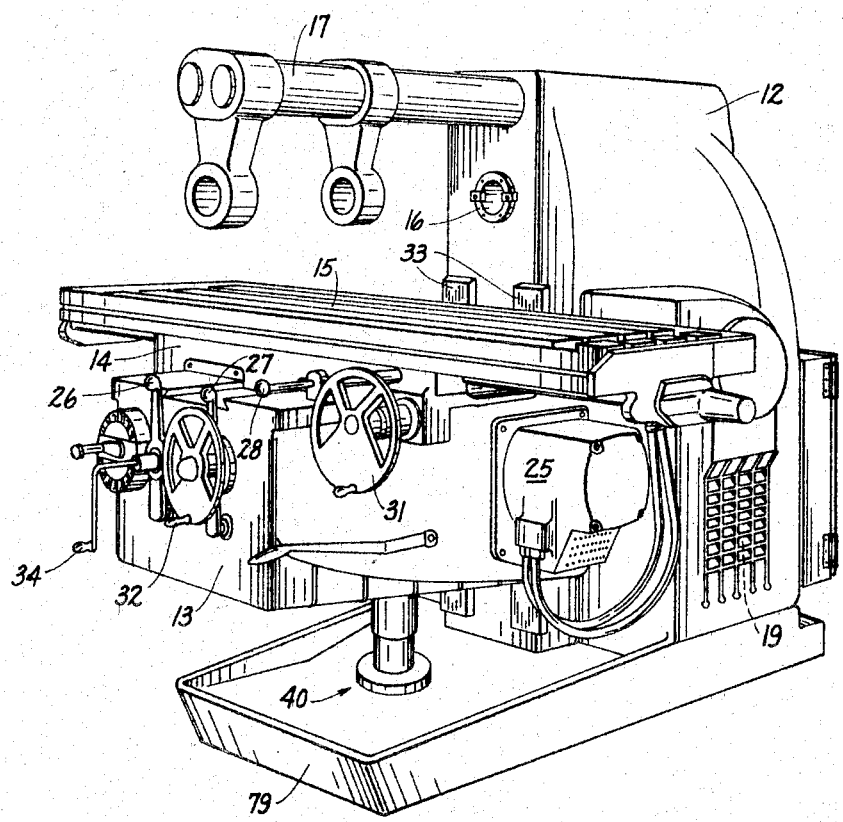

Aug. 2, 1966

F. ZANKL 3,263,571

COUNTERBALANCE FOR A MACHINE TOOL

Filed Feb. 12, 1964

2 Sheets-Sheet 1

INVENTOR.
Frank Zankl
BY
William C. Gleisner Jr.
ATTORNEY

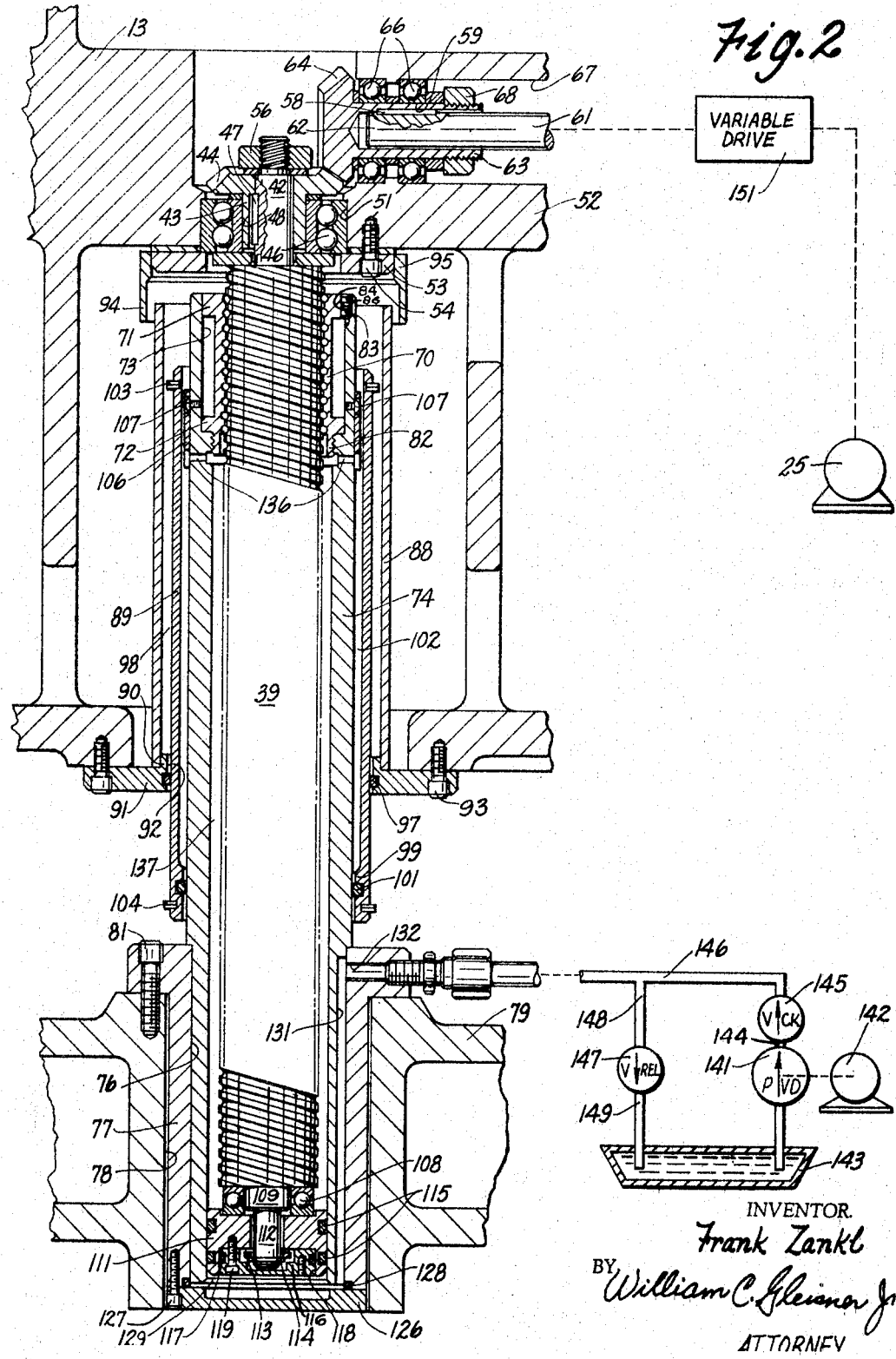

United States Patent Office 3,263,571
Patented August 2, 1966

3,263,571
COUNTERBALANCE FOR A MACHINE TOOL
Frank Zankl, Milwaukee, Wis., assignor to Kearney & Trecker Corporation, West Allis, Wis., a corporation of Wisconsin
Filed Feb. 12, 1964, Ser. No. 344,283
6 Claims. (Cl. 90—58)

The present invention relates generally to machine tools and more particularly to an improved elevating and counterbalance mechanism for a movable member of a machine tool.

It is a general object of the present invention to provide mechanism which is operable to relieve the drive mechanism of a movable machine tool member of at least a portion of the weight of the member.

Another object of the present invention is to provide an improved drive mechanism for a movable member which normally tends to urge the member in an upward direction.

Another object of the present invention is to provide an improved elevating and counterbalancing mechanism for the vertically adjustable work support of a machine tool that is adapted to minimize the deflection in the work support which occurs because of the physical arrangement of the support.

Another object of the present invention is to provide a novel unitary translating mechanism which is operable to effect movement of a movable member with a minimum of force and also to maintain the member in its located position.

Still another object of the present invention is to provide an improved elevating and counterbalancing mechanism for the vertical movable knee of a machine tool which eliminates binding between the knee guideway and the upright supporting guideway which occurs because of the cantilever arrangement of the knee with respect to the upright support.

Yet another object of the present invention is to provide an improved knee elevating and counterbalancing mechanism which utilizes the screw housing as a cylinder of the counterbalance.

A further object of this invention is to provide a counterbalance mechanism that is adapted to utilize elements for dual purposes.

According to this invention, the elevating screw is secured to a movable member, such as the knee of a machine tool, and extends downwardly through a nonrotatable axial fixed nut in which the screw is threadedly engaged. The nut is carried in the upper end of a tubular support that is supported in the base of the machine. A piston is secured to the lower end of the screw and is adapted to reciprocate in the tubular support with the screw. Below the piston there is formed a hydraulic chamber to which fluid under pressure is supplied which acts on the piston to apply a force to the screw to counterbalance the weight of the knee assembly on the screw. Thus, the force necessary to effect upward movement of the knee relative to its supporting structure is reduced.

The foregoing and other objects of this invention, which will become more fully apparent from the following detailed description, may be achieved by means of the exemplifying apparatus depicted and set forth in this specification in connection with the accompanying drawings, in which:

FIGURE 1 is a perspective view of a machine tool incorporating the features of the present invention; and, FIG. 2 is an enlarged fragmentary view in vertical section taken through the knee drive mechanism and showing the counterbalance mechanism.

Reference is now made more particularly to the drawings and specifically to FIGURE 1 thereof, illustrating a horizontal spindle knee type machine tool in which the features of the present invention have been incorporated. The machine structure comprises essentially an upstanding column 12 which serves to carry on its front face a knee 13, saddle 14 and work supporting table 15. These members are superimposed for selective slidable movement in a plurality of mutually transverse planes. Near the top of the column 12 there is journaled the usual horizontally disposed tool receiving spindle 16 and above it are slidably mounted overarms 17 for supporting a cutter arbor (not shown) that may be mounted in the spindle 16 in a well-known manner to carry a cutter in cooperating relationship with a workpiece (not shown) on the work supporting table 15.

Power for rotating the spindle 16 is obtained from a motor (not shown) that is located in a motor compartment 19 formed within and extending transversely of the lower part of the column 12. Power for effecting movement of the vertically slidable knee 13, the transversely slidable saddle 14 and the longitudinally slidable table 15 is derived from a separate feed motor 25 mounted on the rightward side of the knee 13. To effect selective directional movement of the knee 13, saddle 14 and table 15, there are provided at the front of the machine directional shifting levers 26, 27 and 28 operatively connected to actuate reversing clutch mechanisms for transmitting power to drive the respective movable members.

For effecting manual adjustment of the knee 13, the saddle 14 and the table 15, there are provided individual and separately operable manual control means. Manual longitudinal movement of the table 15 is accomplished by rotating a hand wheel 31 which is selectively connectible to effect rotation of the table screw (not shown). For effecting cross movement of the saddle 14, a handwheel 32 at the front of the knee 13 is selectively connectible to effect manual rotation of a cross traversing screw (not shown). Vertical manual adjustment of the knee 13 along vertical way surfaces 33 formed on the front face of the column 12 is accomplished by operation of a hand crank 34 that is selectively connectible to effect rotation of a knee elevating screw 39, shown in FIG. 2.

The force required to move the knee assembly and the excessive wear on the driving mechanism caused by the unbalanced weight of the knee induce inaccuracies in the table position, as well as, binding between the supporting guide surface of the column and the complementary guide surface of the knee. To eliminate these deficiencies it is customary to counterbalance vertically movable members so as to reduce both the power required to move the slides and also reduce the wear on the driving mechanism. However, the known counterbalancing arrangements have always been applied to the movable slide structure as close as possible to the supporting guideways and are either attached to the top of the movable slide, as in the case of a vertical movable head, or the counterbalancing force is applied to the bottom of the movable slide as near as possible to the middle of the member and adjacent to the guideway.

To obviate the possibility of the knee of the machine being deflected; and to eliminate the canting of the knee on the column way surfaces 33; and relieve the screw and nut knee elevating drive mechanism of at least a portion of the weight of the knee assembly thereby reducing the force required for moving the knee; and to provide an improved counterbalancing and driving arrangement which cooperatively provide maximum rigidity for the knee the present novel mechanism is provided. The improved counterbalance mechanism 40 utilizes structure provided for the screw and nut drive mechanism so that the counterbalancing mechanism requires little additional structure. In addition the novel counterbalance arrangement operates to apply its force to the elevating screw concentrically with the driving force thereby insuring that additional movements are not applied to the knee.

The knee 13, as previously mentioned, is moved to any selected position of vertical adjustment by means of a screw and nut drive mechanism. As more clearly shown in FIG. 2, the elevating screw 39 is provided with an upper end portion 42 of reduced diameter disposed to be drivenly received in a sleeve 43 of a bevel gear 44 which is journaled in an antifriction bearing 46. A drive connection between the screw 39 and the bevel gear 44 is effected by means of a key 47 engaged in a keyway 48 formed in the opening of the sleeve. The antifriction bearing 46 is disposed within a bored opening 51 formed in a horizontally extending internal web 52 provided in the knee structure 13. A retainer ring 53 is secured to the bottom of the web 52 by screws 54 and serves to maintain the bearing 46 within the opening 51. A locking nut 56 serves to maintain the bevel gear 44 in operative relationship on the screw 39 and also to rotatably secure the screw 39 to the web 52.

As previously mentioned, the screw 39 is operatively connected to be power driven from the motor 25 or manually rotated by operation of the hand crank 34. The motor 25 is connectible, through suitable clutches and gearing (not shown) such as a variable speed drive mechanism generally indicated by the reference numeral 151, to power input shaft 61, the inner end 62 of which is engaged in a tubular sleeve 63 of a bevel gear 64. A drive connection between the shaft 61 and the bevel gear 64 is effected by means of a key 58 engaged in a longitudinal extending keyway 59 formed in the opening in the sleeve 63. The sleeve 63 of the bevel gear 64 is journalled in a pair of antifriction bearings 66 which are disposed in a bored opening 67 formed in the web 52. The antifriction bearings 66 and bevel gear 64 are retained in operative position by a locking nut 68 threadedly engaged on the end of the sleeve portion 63 of the bevel gear 64. The bevel gear 64 is disposed in meshing engagement with the bevel gear 44. Thus, a rotational input to the shaft 61 by operation of the motor 25 or hand crank 34 will be transmitted via bevel gears 64 and 44 to rotatably drive the screw 39 in a selected direction.

The rotatable screw 39 extends downwardly to engage its cooperating nut 70 which is formed with spaced apart upper and lower radial flanges 71 and 72 that are disposed within an enlarged bored opening 73 formed in the upper end of a tubular supporting column 74.

The rotatable screw 39 is provided with a helically formed ball receiving groove of semi-circular cross section adapted to constitute a helical ball race. The stationary nut 70 is of the recirculating ball type provided with a cooperating internally formed helical ball receiving groove of semi-circular cross section. Return tubes (not shown) interconnect the end portions of the ball groove of the nut and are adapted to cooperate therewith in a manner to constrain a plurality of ball bearings (not shown) for recirculating movement between a portion of the groove in the screw 39 and the cooperating groove in the nut. While an antifriction screw and nut drive arrangement is illustrated as a preferred drive it is to be understood that the present invention may be incorporated with any other drive.

The lower end of the column 74 is provided with a reduced diameter portion disposed to be received in an axial opening 76 provided in an elongated housing sleeve 77 which, in turn, is secured in the forwardly projecting column base 79. The circular housing sleeve 77 is received within an enlarged vertically bored opening 78 formed within the column base 79 and is secured thereto by screws 81 extending through a flanged portion of the sleeve 77 to engage the base 79.

The nut 70 is disposed in coaxial relationship in the enlarged opening 73 of the supporting column 74 and has a depending threaded sleeve portion 82, which is threadedly engaged in the threaded upper portion of the bore of the column 74. A threaded flat point socket set screw 83 is threadedly engaged in complementary semicircular threaded recesses 84 and 86 formed in the periphery of the flange 71 and the surface of the bore 73 and serves to prevent the nut 70 from rotating in the column 74. Thus, the nut 70 is held against axial and rotational movements.

To protect the elevating screw and nut assembly from external damage and also to provide an oil sump for storing and accumulating lubricating oil that will circulate down from the bearings 66 and 46, there are provided telescoping housings 88 and 89. The outer housing 88 is disposed to engage on a circular inwardly extending hub 90 formed on a retainer 91 which is provided with an axial bored opening 92. The retainer 91 is disposed in coaxial relationship to the screws 39 and is secured to the under surface of the knee structure by screw 93 extending through a flanged portion of the retainer to engage in the knee 13. The outer housing 88 extends upwardly from retainer 91 and extends into a depending circular skirt portion of a circular collar 95 that is mounted on and secured to the retainer ring 53. The arrangement is such that the outer housing 88 moves with the knee structure.

The inner housing 89 is disposed in concentric relationship around the column 74 and passes through the opening 92 of the hub 90. An oil seal 97 is provided to seal the space between the surface of the opening 92 and the external surface of the housing 89. Thus, a space 98 is formed between the internal surface of the housing 88 and the outer surface of the inner housing 89 and operates as an oil sump to receive excess oil which circulates downwardly from the gears and bearings. The inner housing 89 is provided with an inwardly extending flange 99 in which an oil seal 101 is received and which is disposed to engage the surface of the column 74. The inner housing 89 is formed so that its internal diameter is larger than the external diameter of the shaft 74 thereby defining a space 102 which will also serve as an oil sump.

A snap ring 103 is engaged in a suitable annular groove formed on the upper end of the inner housing 89 and serves as an abutment against which the annular flange 90 of the retainer 91 will engage to enforce upward movement of the inner housing 89. In a similar manner, a lower snap ring 104 is engaged in a suitable annular groove formed on the lower end of the housing 89. This snap ring also serves as an abutment against which the outer surface of the retainer 91 may engage to enforce downward movement of the housing 89 from an extended upper position to which it may have been moved by an upward movement of the knee 13.

To limit the upward travel of the housing 89 there is provided a collar 106 which is mounted on the column 74 at the upper end thereof and secured in position by means of screws 107. Thus, when the inner housing 89 has reached an upper limit of travel, as defined by the collar 106, the flange 99 will engage the collar 106 to stop upward movement of the housing. The arrangement of the telescoping housings 88 and 89 is particularly advantageous in providing oil sumps for receiving excess oil from the internal bearings and gears while allowing the knee 13, the saddle 14 and the table 15 to be moved to their lowest and highest possible positions within their allowable range of vertical movement, as provided for by the operation of the elevating screw 39 and its cooperating nut 70.

To relieve the elevating screw 39 and its cooperating nut 70 of the combined weight of the knee 13, saddle 14 and table 15 to thereby reduce the force requirement for effecting movement of these members, a counterbalance mechanism is provided. The novel counterbalance mechanism utilizes structural components associated with the elevating drive mechanism. As shown in FIG. 2, the lower end of the screw 39 is provided with a reduced portion 109 on which an antifriction thrust bearing 108 is mounted. A piston 111 is mounted on a further reduced portion 112 of the screw 39 and is disposed to abut the lower race of the thrust bearing 108. A washer 113 and a snap ring 114 are provided to maintain the piston 111 and bearing 108 in operative position on the lower end of the screw 39. To prevent leakage of fluid past the piston 111 a pair of circular oil seals 115 are disposed within suitable annular grooves formed in the peripheral surface of the piston 111. To provide the piston 111 with a leak proof face or head, a plug 116 having an oil seal 117 is disposed within an opening 118 which is formed in the piston 111 to facilitate the assembly of the piston to the screw. The plug 116 is secured in the opening by means of screws 119.

The lower end of the housing sleeve 77 is closed by means of a plate 126 that is secured to the end of the sleeve by means of screws 127. A circular oil seal 128 is provided to prevent fluid from leaking past the joint surface between the end of the sleeve and the abutting face of the closure plate 126. With this arrangement a fluid pressure chamber 129 is formed on the head side of the piston 111 by the surface of the bore of the column 74, piston 111 and closure plate 126.

The lower end of the column 74 is spaced from the inner face of the closure plate 126 a slight amount which space serves as a circular passageway through which fluid under pressure is supplied to the chamber 129. A longitudinally extending groove 131 is formed in the peripheral surface of the lower end of the column 74 and in cooperation with the surface of the bore 76 of the housing sleeve 77, forms a fluid passage that communicates with the chamber 129. A radial extending passage 132 is formed in the flange of the housing sleeve 77 and extends from the periphery of the flange to the surface of the bore 76 to communicate with the groove 131.

At the upper end of the column 74 radial openings 136 are formed in the wall of the column to provide communicating passageways between a sump 137 formed by the surface of the bore of the column 74 and the surface of the screw 39 and the space or sump 102 previously described. Thus, as the piston 111 moves upwardly with the screw 39 an excess of oil which may have accumulated in the sump 137 will flow out through the passages 136 into the sump 102 from whence it may overflow into the sump 98.

It is apparent that the column 74 serves as a housing for the antifriction screw 39; as a supporting pedestal for the antifriction nut 70; as an oil sump for oil that circulates downwardly from the gear compartment above; and also as the cylinder for the counterbalance mechanism. The screw 39 also serves a multiple purpose function; it is the translating member of the screw and nut drive mechanism and also serves as the counterbalance force applying member. The multiple functional elements mutually cooperate to provide a novel translating drive and counterbalance mechanism which is operable to apply a counterbalancing force to the member which it is connected to move. The counterbalancing function cooperates to assist the translational drive function of the mechanism.

Whenever the machine tool depicted in FIGURE 1 is operating, fluid under pressure is constantly supplied to the chamber 129. To this end, a variable delivery pressure compensated pump 141 is driven by an electric motor 142 and operates to withdraw fluid from a reservoir 143. The output of the pump is discharged into a pressure line 144 and flows through a connected check valve 145 which is connected to one end of a conduit 146. The opposite end of the conduit 146 is connected to the radial passage 132 in the flange of the sleeve housing 77. Thus, fluid under pressure is directed from the pump 141 into the passage 132 and thence by means of the groove 131 into the chamber 129 below the piston 111. The fluid under pressure supplied to the chamber 129 will act on the piston 111 to apply a force thereto. This force is transmitted to the screw 39 to counterbalance the weight of the knee assembly and relieve the screw and nut drive mechanism of this load so that a minimum force is required to actuate the knee in its vertical path of movement along the way surfaces 33.

Assuming now that the knee 13 is in an elevated position wherein the piston 111 associated with the screw 39 is in its uppermost position within the bore of the column 74. With the knee 13 and piston 111 in their assumed uppermost positions, a power input to the screw 39 to cause the screw to rotate in a direction to effect vertical downward movement of the knee will also effect downward movement of the screw 39 and its associated piston 111. As the piston 111 is forced downwardly, its movement is opposed by the fluid under pressure that is being constantly supplied to the chamber 129 on the head side of the piston. However, the force that the screw 39 exerts in a downwardly direction is greater than the counterbalancing force and will cause the pressure in the chamber 129 below the piston 111 to increase. To relieve this condition, the hydraulic circuit includes a relief valve 147 which is set to open at a preselected pressure which is higher than that established by operation of the pump 141. The relief valve 147 is connected to the hydraulic circuit by means of a conduit 148 and to the reservoir 143 by means of a conduit 149. Therefore, when the screw 39 is rotated in a direction to effect its downward movement, the piston 111 will exhaust the fluid from the chamber 129 at a higher pressure and the exhaust fluid will flow through the groove 131 the passage 132, conduits 146 and 148 through the relief valve 147 and be returned to the reservoir 143 via the conduit 149. At this time the check valve 145 will close to prevent back flow of fluid to the pump 141. As soon as the downward movement of the screw 39 is stopped, the pressure in the hydraulic system is again reduced to the normal operating pressure at which the pump is set to operate. Thereupon, the relief valve 147 will close and the fluid under pressure supplied by the pump 141 will again operate to apply a counterbalancing force to the screw 39.

It is to be noted that friction in an antifriction recirculating ball bearing screw and nut drive mechanism is minimum. Therefore, when the power input to the shaft 61 is disconnected, the weight of the knee assembly will tend to drive the screw causing the knee assembly to move downwardly in an uncontrolled movement. However, with the present invention the counterbalancing force is always present in the drive mechanism and serves to resist the free movement of the knee assembly.

From the foregoing detailed description of an explanation of the operation of the exemplifying counterbalance and drive mechanism herein set forth as a practical embodiment of the present invention, it will be apparent that there has been provided an improved counterbalancing and drive mechanism for a movable machine tool member which is extremely effective in operation and is relatively inexpensive to manufacture by reason of the multiple function of the various components.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, I hereby claim as my invention:

1. In a machine tool having a support on which a member is carried for vertical movement;
   a screw and nut mechanism connected to effect the vertical movement of said machine member in either direction selectively;
   means connected to said screw and nut mechanism to form a pressure chamber;
   a source of fluid pressure connected to said chamber to apply a force directly to said screw to counterbalance the machine member to which said screw and nut mechanism is connected and thereby reduce the load on said screw and nut mechanism; and
   means operable in response to an increase in the pressure in said chamber to effect a reduction in the pressure to the normal operating pressure as developed by the fluid supplied to said chamber.

2. In an antifriction screw and nut translating mechanism of the type wherein the screw is movable relative to the cooperating nut and is connected to effect the movement of a member;
   a hollow support for said nut and adapted to receive the unconnected end of said screw;
   means on the free end of said screw cooperating with the interior surface of said support to define an expansible fluid chamber;
   a source of pressure fluid including a fluid circuit operably connected to supply said expansible chamber with pressure fluid for maintaining a predetermined constant counterbalancing force on said screw; and,
   means interconnected in said fluid circuit to relieve said circuit of excessive pressure above a predetermined value.

3. In a machine tool having a support;
   a member mounted for vertical movement on said support;
   a non-rotatable and axially stationary nut carried by the support;
   a screw operably engaged in said nut and having one end secured to said member, said screw being rotatable and axially movable relative to said nut;
   a fluid actuator connected to the free end of said screw and operable when energized to apply an axial upward force to said screw to counterbalance said machine member, thereby minimizing the load to be moved by said screw and nut;
   a source of fluid pressure;
   a fluid circuit including a pressure relief valve connecting said source of fluid pressure to said actuator to energize it; and,
   means operably connected to effect rotation of said screw in either direction selectively to thereby effect movement of said member relative to said support.

4. In a machine tool having a base on which a member is supported for bodily movement;
   a tubular support upstanding from said base;
   a nut disposed in the upper end of said tubular support in a manner to be non-rotatable and axially immovable therein;
   a screw operatively engaged in said nut and having its upper end connected to the machine member, said screw extending downwardly from said nut within the interior of said tubular support;
   a piston secured to the lower end of said screw and operating in cooperation with the lower end of said tubular support to define an expansible fluid chamber;
   a source of pressure fluid connected to supply pressure fluid to said chamber for applying a predetermined force to said piston to counterbalance the weight of the member and thereby reduce the load on the cooperating screw and nut;
   operable means connected to relieve the pressure in said chamber to maintain a normal operating pressure therein; and,
   means connected to actuate said screw to effect the movement of said machine member.

5. In a machine tool having a support;
   a machine member mounted on said support for movement relative thereto;
   a cylinder carried by said support with its axis in a vertical plane;
   an antifriction nut mounted in the upper end of said cylinder in a manner to be axially immovable and also non-rotatable therein;
   an antifriction screw operatively engaged in said nut, said screw having its upper end extending outwardly of said nut and operatively connected to said movable machine member, said screw also extending downwardly from said nut within said cylinder;
   means operably connected to actuate said screw in either direction selectively;
   means on the free end of said screw cooperating with the wall surface of the bore of said cylinder to form a fluid chamber below said screw;
   a source of fluid pressure including a hydraulic circuit connected to supply fluid under pressure to said chamber to thereby apply an axial force to said screw which operates to counterbalance said movable member; and,
   valve means in said hydraulic circuit operable upon an increase in the normal operating pressure to relieve said circuit of excess fluid.

6. In a machine tool having a support and a member carried by the support for vertical movement.
   an upstanding tubular housing carried by the support;
   an antifriction nut disposed in the upper end of said tubular housing in a manner to be non-rotatable and axially immovable therein;
   a rotatable and axially movable antifriction screw cooperatively engaged in said nut and having its upper end connected to the machine member, said screw having its lower end disposed within said tubular housing;
   a piston secured to the depending end of said screw, said piston in cooperation with the bore of said tubular housing forming a fluid actuator having a single pressure chamber;
   a source of fluid pressure including a hydraulic circuit connected to supply said pressure chamber with fluid to effect the operation of said actuator for applying an axial force to said screw for counterbalancing the machine member thereby reducing the load on said screw and nut; and,
   valve means in said circuit operable to open at a predetermined pressure which is higher than that supplied to said actuator from said source to relieve said circuit of fluid.

References Cited by the Examiner

UNITED STATES PATENTS

| 1,905,673 | 4/1933 | Archea | 77—36 X |
| 2,201,934 | 5/1940 | Turretini | 77—36 |
| 2,452,674 | 11/1948 | Nenninger et al. | |
| 2,759,378 | 8/1956 | Youssoufian et al. | 77—36 |
| 2,958,232 | 11/1960 | Benninghoff et al. | |

FOREIGN PATENTS

| 653,706 | 12/1962 | Canada. |
| 901,233 | 2/1962 | Great Britain. |

WILLIAM W. DYER, Jr., *Primary Examiner.*

L. VLACHOS, *Assistant Examiner.*